United States Patent
Hauschild

(10) Patent No.: US 7,085,062 B2
(45) Date of Patent: Aug. 1, 2006

(54) APPARATUS FOR SHAPING A LIGHT BEAM

(75) Inventor: Dirk Hauschild, Dortmund (DE)

(73) Assignee: Hentz-Lissotschenko Patentverwaltungs GmbH & Co. KG, Gerstengrund (DE)

( * ) Notice: Subject to any disclaimer, the term of this patent is extended or adjusted under 35 U.S.C. 154(b) by 0 days.

(21) Appl. No.: 10/864,815

(22) Filed: Jun. 10, 2004

(65) Prior Publication Data

US 2005/0018294 A1    Jan. 27, 2005

(30) Foreign Application Priority Data

Jun. 18, 2003    (DE)    ................................ 103 27 733

(51) Int. Cl.
*G02B 27/10* (2006.01)
*G02B 27/42* (2006.01)
*G02B 5/18* (2006.01)

(52) U.S. Cl. ...................... 359/626; 359/619; 359/624; 359/621; 359/622; 359/558; 359/565; 359/573; 362/268; 362/280

(58) Field of Classification Search ................ 359/626, 359/618, 619, 621, 622, 623, 624, 710, 558, 359/565, 566, 563, 569, 570, 573, 574, 575; 362/268, 280

See application file for complete search history.

(56) References Cited

U.S. PATENT DOCUMENTS

| | | | | |
|---|---|---|---|---|
| 4,733,944 A | * | 3/1988 | Fahlen et al. | 359/624 |
| 5,477,383 A | | 12/1995 | Jain | 359/565 |
| 5,775,799 A | * | 7/1998 | Forkner | 362/268 |
| 5,796,521 A | * | 8/1998 | Kahlert et al. | 359/619 |
| 5,805,340 A | | 9/1998 | Kelly | 359/514 |
| 6,038,075 A | * | 3/2000 | Yamazaki et al. | 359/626 |
| 6,239,913 B1 | * | 5/2001 | Tanaka | 359/619 |
| 6,373,633 B1 | | 4/2002 | Brown | 359/618 |
| 6,728,040 B1 | * | 4/2004 | Mikhailov et al. | 359/622 |
| 6,859,326 B1 | * | 2/2005 | Sales | 359/619 |

FOREIGN PATENT DOCUMENTS

| | | |
|---|---|---|
| DE | 196 19 481 | 11/1997 |
| DE | 101 39 355 | 2/2003 |
| EP | 0 603 861 | 6/1994 |
| JP | 11016851 | 1/1999 |

* cited by examiner

*Primary Examiner*—Loha Ben
(74) *Attorney, Agent, or Firm*—Hoffman Wasson & Gitler PC

(57) ABSTRACT

The invention relates to an apparatus for shaping a light beam, having at least two optically functional boundary surfaces that are arranged one behind another in the propagation direction (z) of the light beam to be shaped, such that the light beam can pass through the at least two optically functional boundary surfaces one after another, and two groups of refractive or diffractive imaging elements that are arranged on at least one of the optically functional boundary surfaces, at least two of the imaging elements having different properties within at least one of the groups.

17 Claims, 4 Drawing Sheets

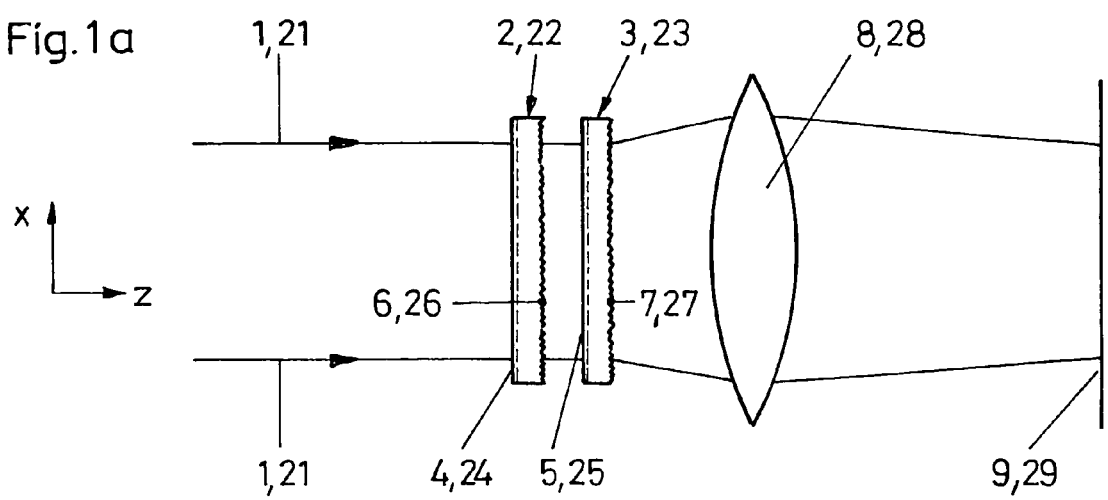
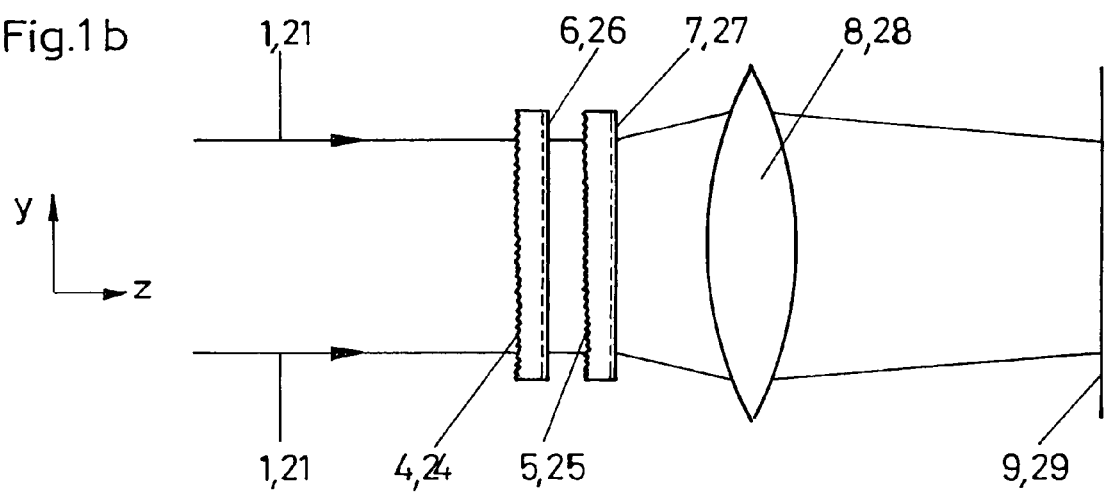

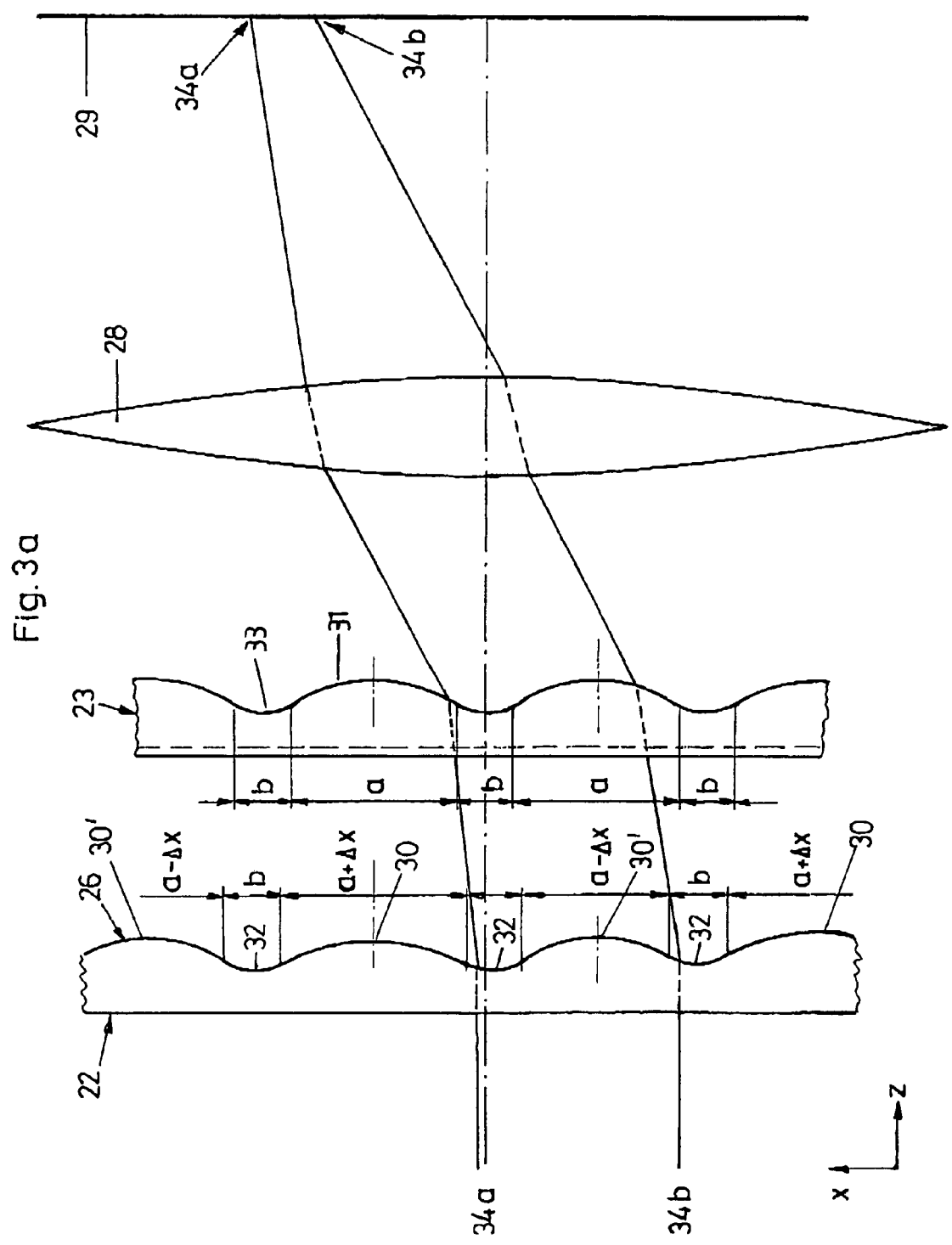

APPARATUS FOR SHAPING A LIGHT BEAM

BACKGROUND OF THE INVENTION

The present invention relates to an apparatus for shaping a light beam, having at least two optically functional boundary surfaces that are arranged one behind another in the propagation direction of the light beam to be shaped, such that the light beam can pass through the at least two optically functional boundary surfaces one after another, and two groups of refractive or diffractive imaging elements that are arranged on at least one of the optically functional boundary surfaces.

Apparatuses of the abovenamed type are used, for example, for the purpose of homogenizing laser beams, in particular laser beams of excimer lasers. DE 199 15 000 A1, for example, discloses an apparatus for homogenizing an excimer laser beam that has two lens arrays composed of spherical cylindrical lenses. The lens arrays in this case form two optically functionally boundary surfaces, spaced apart from one another, through which the light beam to be shaped can pass one after another. The cylindrical lenses on the two optically functional boundary surfaces spaced apart from one another are arranged sequentially in this case such that a component beam impinging substantially perpendicularly on the first optically functional boundary surface are switched through a cylindrical lens of the first optically functional boundary surface, and thereupon subsequently passes through a cylindrical lens, aligned with this cylindrical lens, on the second optically functional boundary surface. The component beams passing through the two optically functional boundary surfaces can be superimposed in a processing plane by the positive lens designed as a Fourier lens. It proves to be disadvantageous in this apparatus that the spherical cylindrical lenses are arranged next to one another in such a way as to produce between them a non-defined transition region that either passes or scatters light impinging on it in an uncontrolled fashion. As a result, the intensity distribution of the laser radiation in the processing plane is disadvantageously influenced, and further it is not possible to use the complete area of the optically functional boundary surfaces for shaping the laser beam.

U.S. Pat. No. 6,239,913 B1 discloses an apparatus of the type mentioned at the beginning in which a group of convex cylindrical lenses and a group of concave cylindrical lenses are respectively arranged on two optically functional boundary surfaces. The convex and the concave cylindrical lenses alternate with one another in this case such that the entire boundary surface is covered by the convex and concave lens structures. An apparatus that is possible in accordance with this U.S. patent is to be seen from FIG. 1a, FIG. 1b and FIG. 2a. Cartesian co-ordinate systems are depicted in the figures in order to improve clarity.

FIG. 1a and FIG. 1b show a laser beam 1 that is to be shaped and which moves in the positive Z-direction. The laser beam 1 passes through two lens arrays (2, 3) that in each case have optically functional boundary surfaces 4, 5 on the entrance surface and optically functional boundary surfaces 6, 7 on the exit surface. The laser beam passing through the lens arrays 2, 3 passes through a lens means 8 that serves as a Fourier lens and is designed as a biconvex lens, and is focused thereby in a processing plane 9. Individual component beams of the laser beam 1 are superimposed in the processing plane 9. It may be seen from FIG. 1a and FIG. 1b that the optically functional boundary surfaces 4, 5 on the entrance surface have structures resembling cylindrical lenses and whose axes extend in the X-direction, whereas the optically functional boundary surfaces 6, 7 on the exit surface of the lens arrays 2, 3 have structures resembling cylindrical lenses of which the cylinder axes extend in the Y-direction.

The beam shaping of the laser beam 1 with regard to the X-direction by the optically functional boundary surfaces 6, 7 on the exit surfaces of the lens arrays 2, 3 is to be seen more clearly from FIG. 2a. In particular, only portions of the lens arrays 2, 3 are depicted. It may be gathered from FIG. 2a that the optically functional boundary surfaces 6, 7 on the exit surfaces respectively have alternating convex cylindrical lenses 10, 11 and concave cylindrical lenses 12, 13. It is to be seen with the aid of the component beams 14a, 14b and 15a, 15b, which are drawn in by their example, that component beams 14a, 14b or 15a, 15b impinging at corresponding points on the convex cylindrical lenses 10 of the first lens array 2 leave the convex cylindrical lenses 10 at equal exit angles and pass through the cylindrical lenses 11, respectively aligned with the corresponding convex cylindrical lenses 10, of the second lens array 3. The component beams 14a, 14b or 15a, 15b exiting the convex cylindrical lenses 11 of the second lens array 3 leave these convex cylindrical lenses 11 at equal angles such that they are focused at the same point in the processing plane 9 by the lens means 8 serving as a Fourier lens. This point is clearly visible on the right-hand side in FIG. 2a. Thus, the Fourier lens permits a superimposition of the component beams passing through different convex lenses 10, 11.

The component beams 16a, 16b or 17a, 17b passing through the concave cylindrical lenses 12 of the first lens array 2 prove to be problematical. In the case of the second lens array 3, the component beams 17a or 16b passing through one of the concave lenses 12 pass through different convex cylindrical lenses 11 such that they impinge on the processing plane 9 at different points. However, component beams 17a, 17b impinging on the same points of neighboring concave cylindrical lenses 12 of the first lens array 2 enter the lens array 3 at an equal angle and are superimposed on one another at the same point in the processing plane 9, as may be seen from the right-hand side of FIG. 2a. It may be seen that the component beams 16a, 16b or 17a, 17b passing through the concave cylindrical lenses 12 of the first lens array 2 impinge essentially on the edge of the region in which the laser radiation is mutually superimposed in the processing plane 9. The result of this is an intensity distribution in the processing plane 9 that may be seen from FIG. 2b. In this intensity distribution, there is a middle, comparatively flat, plateau 18 two outer intensity peaks 19 that project upward above the level of the plateau 18. The outer intensity peaks 19 are each adjoined by respectively outwardly dropping edges 20. These outer intensity peaks 19 prove to be extremely disturbing for various applications. It would be particularly desirable to achieve a comparatively uniform intensity distribution, in particular an intensity distribution for which the intensity peaks 19 do not occur.

The problem on which the present invention is based is to create an apparatus of a type mentioned at the beginning that can generate a more effectively applicable intensity distribution in conjunction with a comparatively complete utilization of the optically functional boundary surfaces.

SUMMARY OF THE INVENTION

According to the invention, at least two of the imaging elements have different properties within at least one of the groups. By means of different properties of at least two, in particular a number of imaging elements within a group, it is possible to avoid, for example, the superimposition of component beams, for example in the edge region of an intensity distribution, in such a way that disturbing intensity peaks are produced. In this way, it is possible to use the apparatus according to the invention to create in the working plane an intensity distribution that is more suitable for some applications than the intensity distribution described in accordance with the prior art and can be seen from FIG. 2b. The apparatus according to the invention is suitable, for example, for applications in lithography.

When the imaging elements are designed as diffractive imaging elements, they can be designed, for example, as grating-like structures, periodic variations in refractive index or the like.

When the imaging elements are designed as refractive imaging elements, they can be designed as lenses, it being possible for the lenses to be designed, in particular, as cylindrical lenses or as quasi-cylindrical lenses.

There is thus the possibility that the at least two lenses of a group differ in their aperture. In addition, or as an alternative thereto, it is possible that the at least two lenses of a group differ in their focal length. Alternatively, or in addition thereto, it is possible that the at least two lenses of a group differ in the shape of their optically functional surface. Alternatively, or in addition thereto it is possible that the at least two lenses of a group differ in their numerical aperture. It is possible by means of all the abovenamed measures to achieve the result that component beams, impinging on the optically functional boundary surfaces, of the light beam to be shaped are not superimposed in the processing plane in such a way that disturbing intensity peaks are produced in the intensity distribution.

For example, it is possible that the first of the two groups comprises convex lenses, and the second of the two groups comprises concave lenses. In particular, it is possible thereby to design the concave lenses as concave cylindrical lenses, and the convex lenses as convex cylindrical lenses. It can be provided in this case that the concave cylindrical lenses and the convex cylindrical lenses are arranged alternately with one another, the cylinder axes both of the concave and for the convex cylindrical lenses extending in the same direction.

In accordance with a preferred embodiment of the present invention, at least two types with in each case a plurality of imaging elements are provided within at least one of the groups, one each of the imaging elements of the first type having different properties compared with one each of the imaging elements of the second type. For example, it is possible thereby that convex cylindrical lenses of the first type, concave cylindrical lenses, convex cylindrical lenses of the second type and concave cylindrical lenses are arranged alternately next to one another in each case on at least one of the optically functional boundary surfaces. Owing to such an arrangement, there is a possibility that the vertex lines of the concave cylindrical lenses of the first optically functional boundary surface are offset from the vertex lines of the concave lenses of the second optically functional boundary surface in a direction perpendicular to the propagation direction of the light beam. As a result it is possible, for example, for component beams that impinge on identical regions of neighboring concave cylindrical lenses of the first optically functional boundary surface to be deflected by the second optically functional boundary surface in such a way that they are not superimposed in the processing plane. In this way, the intensity peaks described with reference to FIG. 2a and FIG. 2b and which prove to be disturbing for many applications are not produced.

According to the invention, there is the possibility that the cylinder axes of the cylindrical lenses on the first optically functional boundary surface are substantially parallel to the cylinder axes of the cylindrical lenses on the second optically functional boundary surface.

Furthermore, it is possible to provide that the apparatus has a third and a fourth optically functional boundary surface with imaging elements. In particular, it is possible in this case that arranged on the third and fourth optically functional boundary surfaces are cylindrical lenses whose cylinder axes are parallel to one another and perpendicular to the cylinder axes of the cylindrical lenses on the first and the second optically functional boundary surface. Here, the cylindrical lenses of the third and fourth optically functional boundary surface can furthermore be equipped with two different types of, for example, convex cylindrical lenses in such a way that a superimposition of, for example, component beams passing through concave cylindrical lenses is avoided to the greatest possible extent in the processing plane with regard to the second direction perpendicular to the propagation direction, as well, such that no intensity peaks occur in the intensity distribution in the processing plane with regard to the second direction, either.

According to the invention, there is the possibility, furthermore, that arranged in the propagation direction of the light beam to be shaped downstream of the at least two optically functional boundary surfaces is a lens means that serves as a Fourier lens and can superimpose in a processing plane component beams, passing through individual imaging elements, of the light beam to be shaped.

BRIEF DESCRIPTION OF THE DRAWINGS

Further features and advantages of the present invention will become clear with the aid of the following description of preferred embodiments with reference to the attached illustrations, in which:

FIG. 1a shows a schematic side view of an inventive apparatus and also of an apparatus according to the prior art;

FIG. 1b shows a view in accordance with the arrow 1b in FIG. 1a;

FIG. 2b shows a schematic of an intensity distribution that can be achieved with the aid of an apparatus in accordance with FIG. 2a;

FIG. 3a shows a schematic, detailed side view of the apparatus according to the invention; and FIG. 3b shows a schematic of an intensity distribution that can be achieved with the aid of an apparatus in accordance with FIG. 3a.

DETAILED DESCRIPTION OF THE INVENTION

Figure 2A:
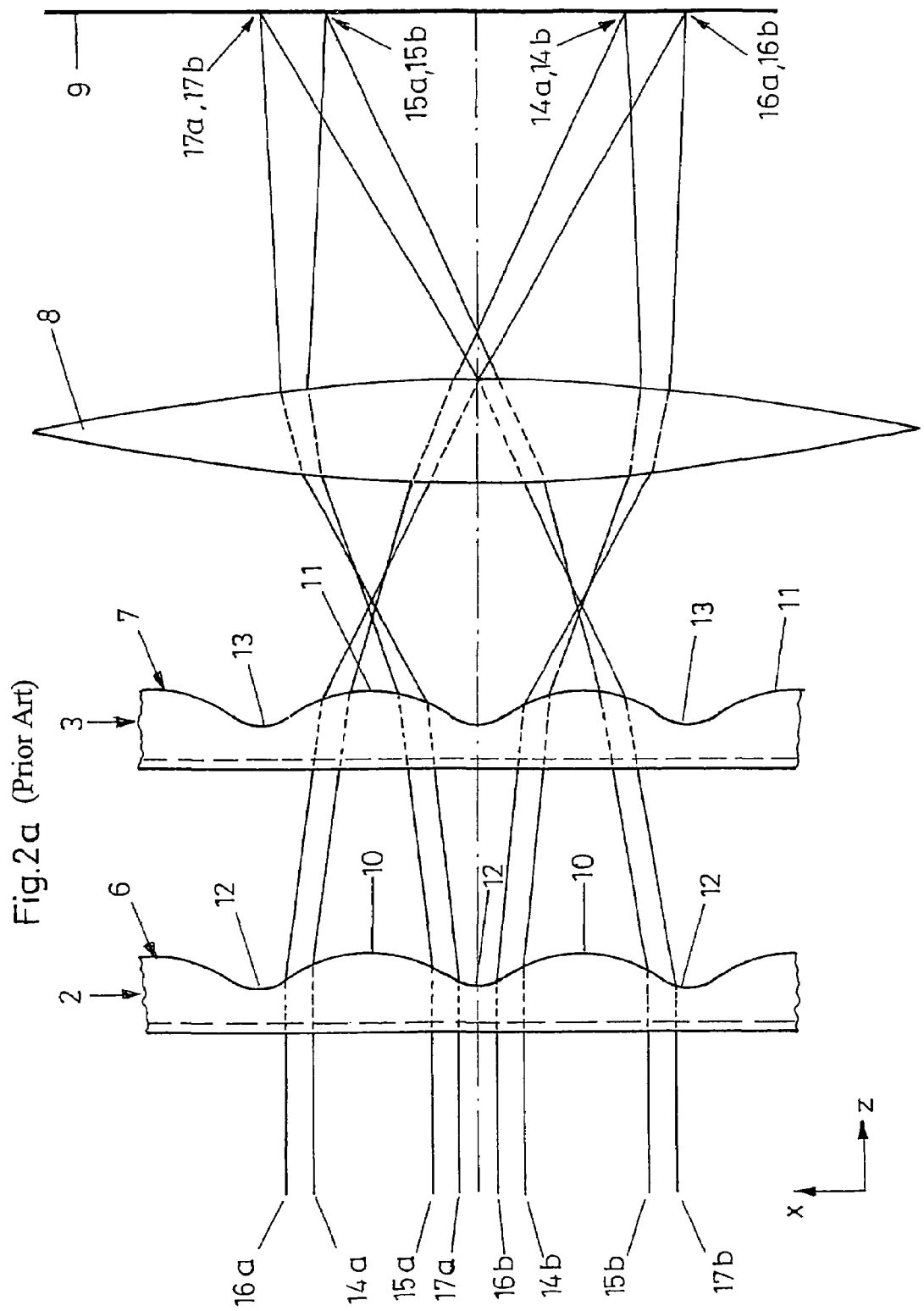
FIG. 2a shows a schematic side view of an apparatus for shaping a light beam in accordance with the prior art.

FIG. 1a and FIG. 1b are schematized in such a way that they can illustrate both the apparatus from the prior art in accordance with FIG. 2a, and an inventive apparatus in accordance with FIG. 3a. The components illustrated in FIG. 1a and FIG. 1b are, firstly, provided with single digit reference numerals 1 to 9 and thereby designate parts that have been explained in the description relating to the prior art in accordance with FIG. 2a. Furthermore, the same parts are provided with double-digit reference numerals 21 to 29, and in this case designate individual parts of the inventive apparatus in accordance with FIG. 3a. In particular, according to the invention in FIG. 1a and FIG. 1b a laser beam 21 runs in the positive Z-direction through lens arrays 22, 23, and is subsequently focused onto an operating plane 25 by a lens means 28 serving as a Fourier lens. In a way similar to the prior art, the lens arrays 22, 23 have optically functional surfaces 24, 25 on the entrance sides, and optically functional surfaces 26, 27 on their exit sides.

The differences from the prior art are to be seen in detail from FIG. 3a. In a way corresponding to FIG. 2a, FIG. 3a shows in turn only the XZ-plane such that only the optically functional boundary surfaces 26, 27 arranged on the exit sides can be recognized. The optically functional boundary surfaces 24, 25 arranged on the entrance sides can, however, be structured in a way similar to the boundary surfaces 26, 27.

The optically functional boundary surface 27 of the second lens array 23 corresponds substantially to the optically functional boundary surface 7 of the second lens array 3 in accordance with FIG. 2a. Here, as well, convex cylindrical lenses 31 are provided once again, and alternate with concave cylindrical lenses 33. In particular, in this case all the convex cylindrical lenses 31 are of the same width, that is to say their extent a in the X-direction is of the same size for each of the convex cylindrical lenses 31. Furthermore, the concave cylindrical lenses 33 arranged between the individual convex cylindrical lenses 31 are also all of the same size, that is to say they all have an extent b of the same size in the X-direction.

The lens array 22 in accordance with FIG. 3a differs from the prior art. There are two types of convex cylindrical lenses 30, 30' of different widths in the X-direction on the optically functional boundary surface 26 arranged on the exit side. The broader type of the cylindrical lenses 30 has an extent of a+Δx in the X-direction, and is therefore greater than a by the magnitude Δx. The smaller the two types of cylindrical lenses 30' has an extent of a−Δx in the X-direction, and is therefore smaller than a by the magnitude Δx in the X-direction. The vertex points of these cylindrical lenses 30, 30' are aligned in the Z-direction with the vertex points of the convex cylindrical lenses 31. Furthermore, a concave cylindrical lens 32 is arranged between in each case a convex cylindrical lens 30 of the first type and a cylindrical lens 30' of the second type, the extent b of each one of these concave cylindrical lenses 32 being of the same size and corresponding to the extent b of the concave cylindrical lenses 33 of the second lens array 23.

The selection of these extents a+Δx, a−Δx and b in each case displaces the vertex points of the concave cylindrical lenses 32 of the first lens array 22 in the X-direction by comparison with the corresponding vertex lines of the concave cylindrical lenses 33 of the second lens array 23.

The result of this is that component beams 34a, 34b of the laser radiation 21 that impinge at the same angle on equal portions of neighboring concave cylindrical lenses 32 of the first lens array 22 certainly leave the latter at the same angle but, nevertheless, are not focused at the same location in the processing plane 29 by the lens means 28. The reason for this is that because of the displacement of the vertex lines of the concave cylindrical lenses 32 of the first lens array 22 by comparison with corresponding concave cylindrical lenses 33 of the second lens array 23 they do not enter the convex cylindrical lenses 31 of the second lens array 23 at corresponding locations. For this reason, they exit the second lens array 23 at different angles such that they are focused at different points by the lens means 28 serving as Fourier lens. This is clearly to be seen in FIG. 3a on the right-hand side.

Figure 2B:
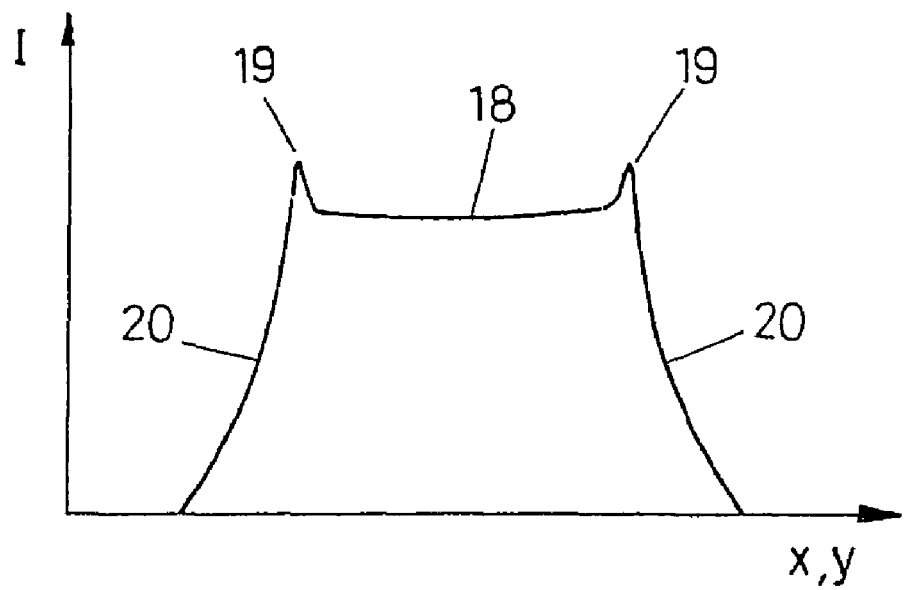
Figure 3B:
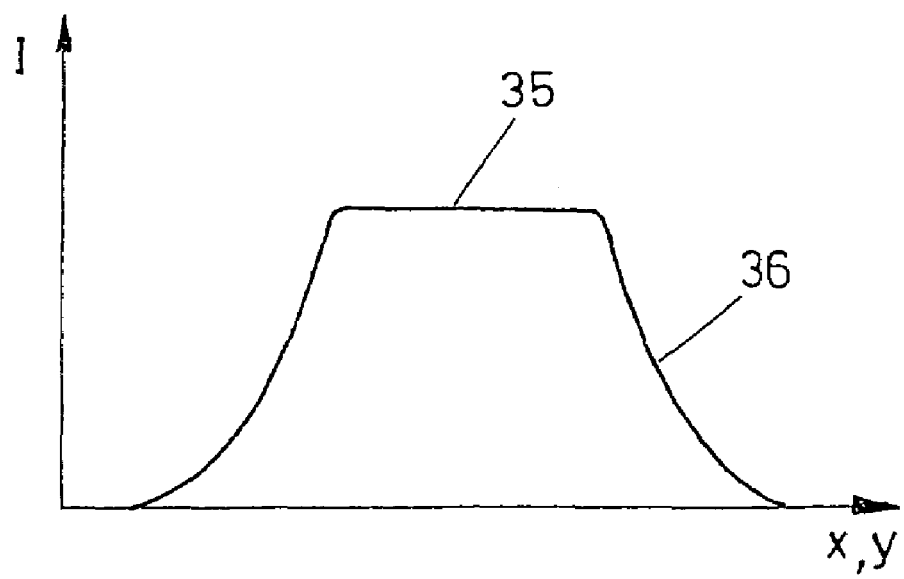

Since the light beams passing through the concave cylindrical lenses 32 are therefore not all superimposed at the same points in the processing plane 29, the outer intensity peaks 19 between the plateau 18 and the folding edges 20 are not produced either, as may be seen from FIG. 2b on the basis of an apparatus in accordance with FIG. 2a. Rather, an inventive apparatus can be used to achieve an intensity distribution in accordance with FIG. 3b that, starting from a middle plateau 35, has folding edges 36 directly adjoining said plateau. In some circumstances, the folding edges 36 can be of somewhat less steep construction than the folding edges 20 of the intensity distribution in accordance with FIG. 2b. Nevertheless, an intensity distribution visible from FIG. 3b is clearly more suitable for many applications than the intensity distribution in accordance with FIG. 2b.

According to the invention, the possibility exists of providing in the first lens array 22 not two types of different convex cylindrical lenses 30, 30' but, for example, three or four or more different types. All of these types of convex cylindrical lenses can provide a different width such as, for example, a+Δx and a−Δx, a+2Δx and a−2Δx, a+3Δx and a−3Δx and so on. This results in three or more different types of displacements of the vertex lines of the concave cylindrical lenses 32 by comparison with the vertex lines of the concave cylindrical lenses 33. The result of this is not two but three or more different points of impingement of component beams that impinge at the same angle on identical locations of different concave cylindrical lenses 32. Consequently, it is possible to use the number of the different types of convex cylindrical lenses 30, 30' and so on to modify the shape of the intensity of distribution which can be achieved with the aid of the apparatus according to the invention in accordance with stipulations that can be fulfilled.

According to the invention, there is the possibility, furthermore, not only of varying the extent of the convex cylindrical lenses 30, 30' in the X-direction, but also of varying the extent of the concave cylindrical lenses 32 in the X-direction. There is also, furthermore, the possibility of using convex or concave cylindrical lenses 31, 33 of different size in the second lens array 23. There is a possibility, furthermore, also of providing on the optical functional boundary surface 24, 25 of the lens arrays 22, 23, that is on the input side, different types of convex cylindrical lenses and/or concave cylindrical lenses in order to achieve in the Y-direction an effect similar to that in the X-direction.

The aforementioned modifications, explained with the aid of FIG. 3a, relate to different apertures of different types of cylindrical lenses. In particular, a displacement of the vertex lines of mutually assigned cylindrical lenses is achieved by these different apertures. However, according to the invention there is the possibility of varying other properties of the lenses. For example, there is the possibility of providing on the optical function boundary surface 26, on the exit site, of the first lens array 22 two types of convex cylindrical lenses and/or two types of concave cylindrical lenses that have mutually different focal lengths. It is also possible to ensure in this way that, for example, component beams that have passed through two neighboring concave cylindrical lenses are not focused onto one point in the processing plane 29. There is the possibility, furthermore, that the shape of the cylindrical lenses is varied. In particular, the cylindrical lenses can have aspheric shape. Thus, the possibility exists of creating two types of convex cylindrical lenses that have a different aspheric shape. Furthermore, it is also possible to create two types of concave cylindrical lenses that have a different aspheric shape.

There is, furthermore, the possibility of providing two types of concave and/or convex cylindrical lenses that have a different numerical aperture.

Furthermore, there is the possibility of undertaking in each case in a type of concave or convex cylindrical lenses a defined variation in the shape of the cylindrical lenses by comparison with the corresponding neighboring cylindrical lenses.

The intensity profile that can be achieved with the aid of the apparatus according to the invention can be set in a defined fashion in accordance with corresponding stipulations by means of all the abovenamed measures.

There is the possibility, furthermore, of using diffractive imaging elements on the optically functional boundary surfaces as an alternative or in addition to refractive imaging elements. The convex and concave cylindrical lenses 30, 31, 32, 33 are to be regarded as refractive imaging elements on the optically functional boundary surfaces 24, 25, 26, 27. Grating-like structures, or periodic variations in refractive index or the like, for example, could be used as diffractive imaging elements. At the end, there is the possibility furthermore of providing two groups of diffractive imaging elements, at least two of the imaging elements in each case having different properties within at least one of the groups. The intensity distribution that can be achieved with the aid of the apparatus according to the invention can be specifically influenced in this way.

What is claimed is:

1. An apparatus for shaping a light beam, comprising
   at least two optically functional boundary surfaces that are arranged one behind another in the propagation direction (z) of the light beam to be shaped, such that the light beam can pass through the at least two optically functional boundary surfaces one after another; and
   two groups of refractive or diffractive imaging elements that are arranged on at least one of the optically functional boundary surfaces;
   wherein
   at least two of the imaging elements have different properties within at least one of the groups and
   wherein
   the diffractive imaging elements are grating-like structures or periodic variations in diffractive index.

2. The apparatus as claimed in claim 1, wherein the refractive imaging elements are lenses.

3. The apparatus in claim 2, wherein the lenses are cylindrical lenses or quasi-cylindrical lenses.

4. The apparatus as claimed in claim 2, wherein the at least two lenses of a group differ in their aperture.

5. The apparatus as claimed in claim 4, wherein the cylinder axes of the cylindrical lenses on a first optically functional boundary surface are substantially parallel to the cylinder axes of the cylindrical lenses on a second optically functional boundary surface.

6. The apparatus as claimed in claim 2, wherein the at least two lenses of a group differ in their focal length.

7. The apparatus as claimed in claim 2, wherein the at least two lenses of a group differ in the shape of their optically functional surface.

8. The apparatus as claimed in claim 2, wherein the at least two lenses of a group differ in their numerical aperture.

9. The apparatus as claimed in claim 2, wherein the first of two groups comprises convex lenses, and the second of the two groups comprises concave lenses.

10. The apparatus as claimed in claim 9, wherein the concave lenses are concave cylindrical lenses and the convex lenses are convex cylindrical lenses.

11. The apparatus as claimed in claim 10, wherein the concave cylindrical lenses and the convex cylindrical lenses are arranged alternately with one another, the cylinder axes both of the concave and the convex cylindrical lenses extending in the same direction (X, Y).

12. The apparatus as claimed in claim 1, further comprising at least two types of imaging elements, each having a plurality of imaging elements provided within the imaging elements of the first type having different properties compared with the imaging elements of the second type.

13. The apparatus as claimed in claim 12, wherein convex cylindrical lenses of the first type, concave cylindrical lenses, convex cylindrical lenses of the second type and concave cylindrical lenses are arranged alternately next to one another in each case on at least one of the optically functional boundary surfaces.

14. The apparatus as claimed in claim 13, wherein the vertex lines of the concave cylindrical lenses of the first optically functional boundary surface are offset from the vertex lines of the concave lenses of the second optically functional boundary surface in a direction (X) perpendicular to the propagation direction (Z) of the light beam.

15. The apparatus as claimed in claim 1, wherein the apparatus has a third and a fourth optically functional boundary surface with imaging elements.

16. The apparatus as claimed in claim 15, wherein arranged on the third and fourth optically functional boundary surfaces are cylindrical lenses whose cylinder axes are parallel to one another and perpendicular to the cylinder axes of the cylindrical lenses on the first and the second optically functional boundary surface.

17. The apparatus as claimed in claim 1, wherein arranged in the propagation direction (Z) of the light beam to be shaped downstream of the at least two optically functional boundary surfaces is a lens means that serves as a Fourier lens and can superimpose in a processing plane component beams, passing through individual imaging elements, of the light beam to be shaped.

* * * * *